United States Patent [19]
Hillery et al.

[11] Patent Number: 5,570,658
[45] Date of Patent: Nov. 5, 1996

[54] ANIMAL RESTRAINT DEVICE

[76] Inventors: Virginia S. Hillery; Virginia S. Hillery, both of 6419 Rosalie Ct., Metairie, La. 70003

[21] Appl. No.: 411,589

[22] Filed: Mar. 29, 1995

[51] Int. Cl.⁶ ........................................ A01K 1/03
[52] U.S. Cl. ..................... 119/751; 119/499; 119/496
[58] Field of Search ...................... 119/19, 158, 729, 119/751, 752

[56] References Cited

U.S. PATENT DOCUMENTS

| | | |
|---|---|---|
| 3,023,734 | 3/1962 | Schaub . |
| 3,428,030 | 2/1969 | Updegraff . |
| 3,850,144 | 11/1974 | Springer et al. ........................ 119/19 |
| 3,941,092 | 3/1976 | Winters ............................. 119/158 X |
| 4,228,765 | 10/1980 | Berlin ..................................... 119/752 |
| 5,279,257 | 1/1994 | Temby ................................... 119/158 |
| 5,282,439 | 2/1994 | Oaks ....................................... 119/19 |

*Primary Examiner*—Robert P. Swiatek
*Attorney, Agent, or Firm*—Joseph N. Breaux

[57] ABSTRACT

An animal restraint device comprising: a housing, having a compartment that is accessed through a closure having an aperture formed therethrough of a size sufficient to allow the neck and head of an animal, such as a dog or cat, to pass therethrough; a closure securing mechanism for securing the closure in a closed position; and an aperture size adjusting mechanism for adjusting the size of the aperture while the neck of an animal is disposed within the aperture to a size that prevents the animal from withdrawing its head through the aperture.

20 Claims, 5 Drawing Sheets

5,570,658

ANIMAL RESTRAINT DEVICE

TECHNICAL FIELD

The present invention relates to devices for restraining animals and more particularly to devices for restraining small animals, such as domesticated cats and dogs, that provide a container having an aperture through which the head of the restrained animal extends.

BACKGROUND ART

Pet owners are often confronted with having to administer medicine to a pet that is unwilling to allow the pet owner to administer the medicine. When this situation exists, the pet owner must restrain a flailing animal while at the same time administering the medicine. This can result in unwanted injuries to the pet and the pet owner. It would be desirable, therefore, to have a device for restraining a pet animal which allowed the pet owner to put the animal under restraint and then administer the medicine to the restrained animal.

Attempts to provide such a device have resulted in restraining devices that are expensive, cumbersome to store, and complicated to use. It would be a benefit, therefore, to have an animal restraint device that was inexpensive to manufacture, easy to store, and easy to rise.

GENERAL SUMMARY DISCUSSION INVENTION

It is thus an object of the invention to provide an animal restraint device that is easy to use.

It is a further object of the invention to provide an animal restraint device that is easily stored when not needed.

It is a still further object of the invention to provide an animal restraint device that is inexpensive to manufacture.

Accordingly, an animal restraint device is provided comprising: a housing, having a compartment that is accessed through a closure having an aperture formed therethrough of a size sufficient to allow the neck and head of an animal, such as a dog or cat, to pass therethrough; a closure securing mechanism for securing the closure in a closed position; and an aperture size adjusting mechanism for adjusting the size of the aperture while the neck of an animal is disposed within the aperture to a size that prevents the animal from withdrawing its head through the aperture.

The compartment is of a size sufficient to allow the body of an animal, such as a dog or cat, to placed within the compartment while the neck and head of the animal extend outwardly of the compartment through the closure aperture. The housing is preferably constructed from a flexible lightweight material, such as cardboard or plastic, and is preferably collapsible to allow for easy storage when not in use.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
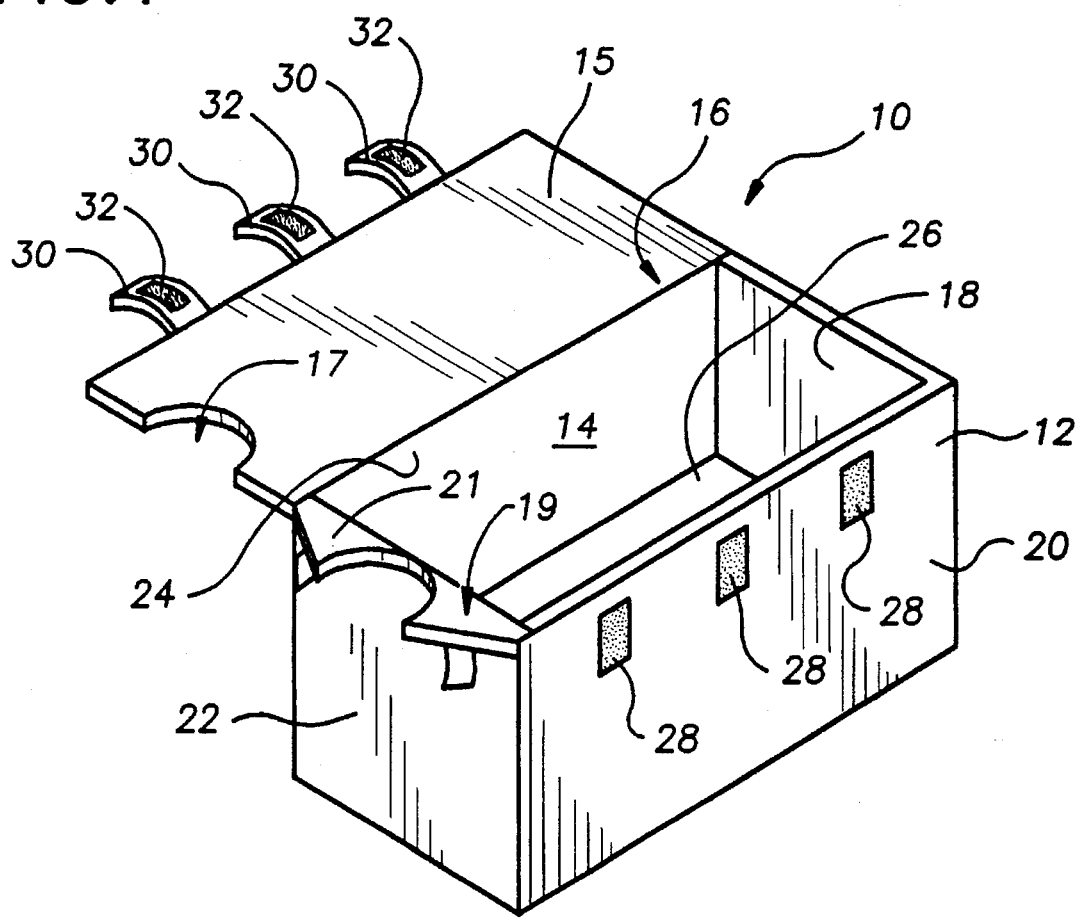
FIG. 1 is a perspective view showing an exemplary embodiment of the restraint device of the present invention with the closure member in the open position.

FIG. 1 shows an exemplary embodiment of the animal restraint device of the present invention generally designated by the numeral 10. Restraint device 10 includes a housing 12 having a compartment 14, a closure member 15 having a closure aperture 17, and a closure aperture adjustment mechanism 19 having a pivoting member 21.

Housing 12 is constructed from a single section of corrugated cardboard which has been cut and folded to form a substantially rectangular shaped box. Compartment 14 is accessible through an open top 16 which is defined by four side members 18,20,22,24, and closed at the bottom by a bottom member 26. Side member 20 has three sections 28 of pile material from a hook and pile type fastener glued thereon. Side member 22 is integrally formed with pivoting member 21. Side member 24 is integrally formed with closure member 15.

Closure member 15 includes three, flexible fastening tabs 30 that each include a section 32 of hook material from a hook and pile type fastener. Fastening tabs 30 are constructed from woven, nylon strapping material. Hook sections 32 are stitched to the free end of each tab and are connectable with pile sections 28 to secure closure member 15 in a closed position during use.

Figure 2:
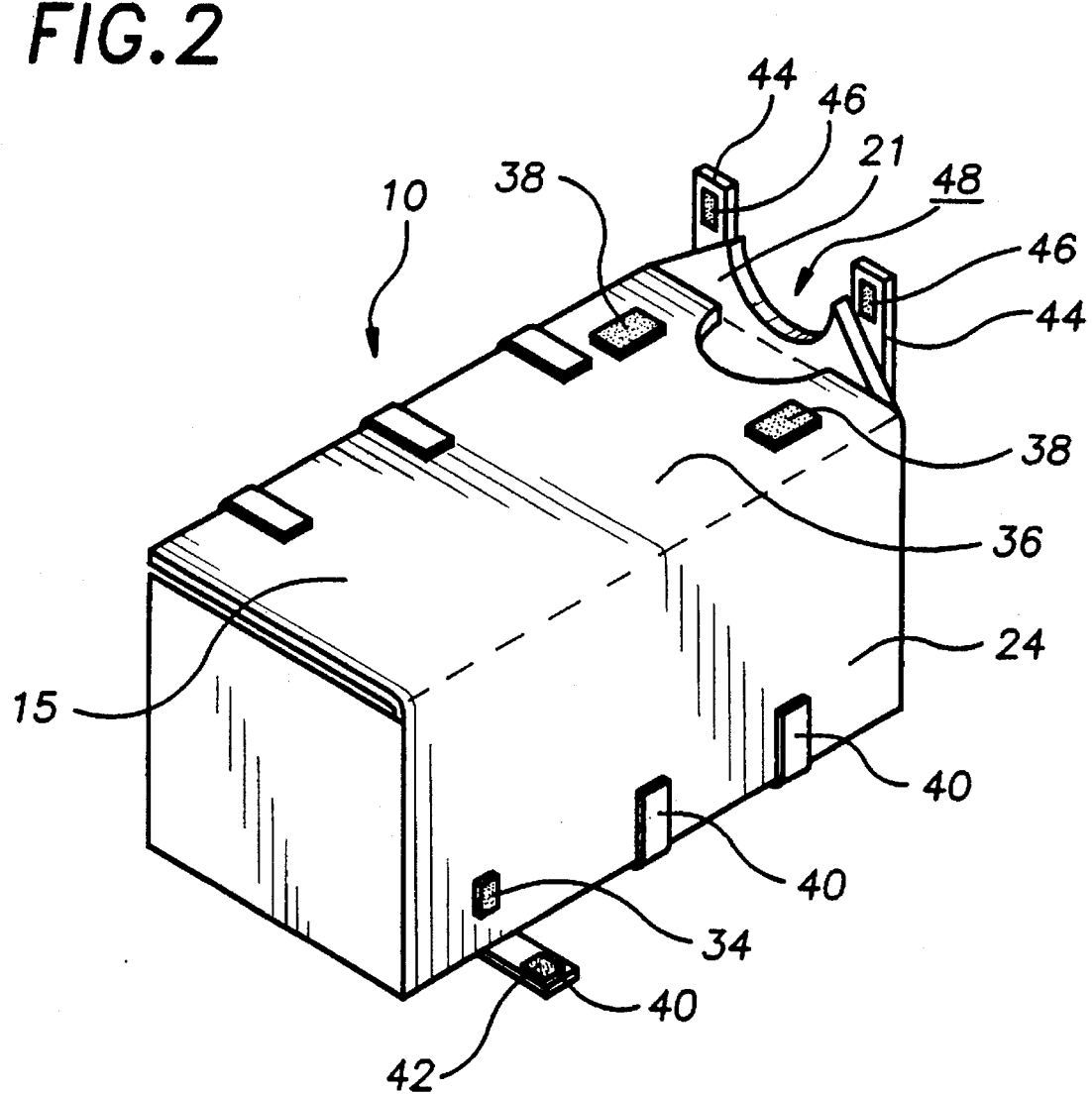
FIG. 2 is a perspective view of the restraint device of FIG. 1 with the closure member in the closed position and the pivoting member of the aperture adjustment mechanism in an upright position.

FIG. 2 shows another view of restraint device 10 with closure member 15 in the closed position. As shown in the figure, he exterior surface of side member 24 includes three sections 34 of pile material from a hook and pile type fastener glued thereto. The exterior surface 36 of closure member 15 has two sections 38 of bile material from a hook and pile type fastener glued thereto.

Pivoting member 21 includes an adjustment aperture 48 and two securing straps 44 that each include a section 46 of hook material from a hook and pile type fastener. Hook sections 46 are attachable to pile sections 38 to secure pivoting member 21 in a desired position during use.

Also shown in FIG. 2 are three securement tabs 40, each including a section 42 of hook material from a hook and pile type fastener. One end of each securement tab 40 is glued to an exterior surface of bottom member 26 (shown in FIG. 1). Hook sections 42 are attachable to pile sections 34 to secure bottom member 26 (shown in FIG. 1) in place during use.

Figure 3:
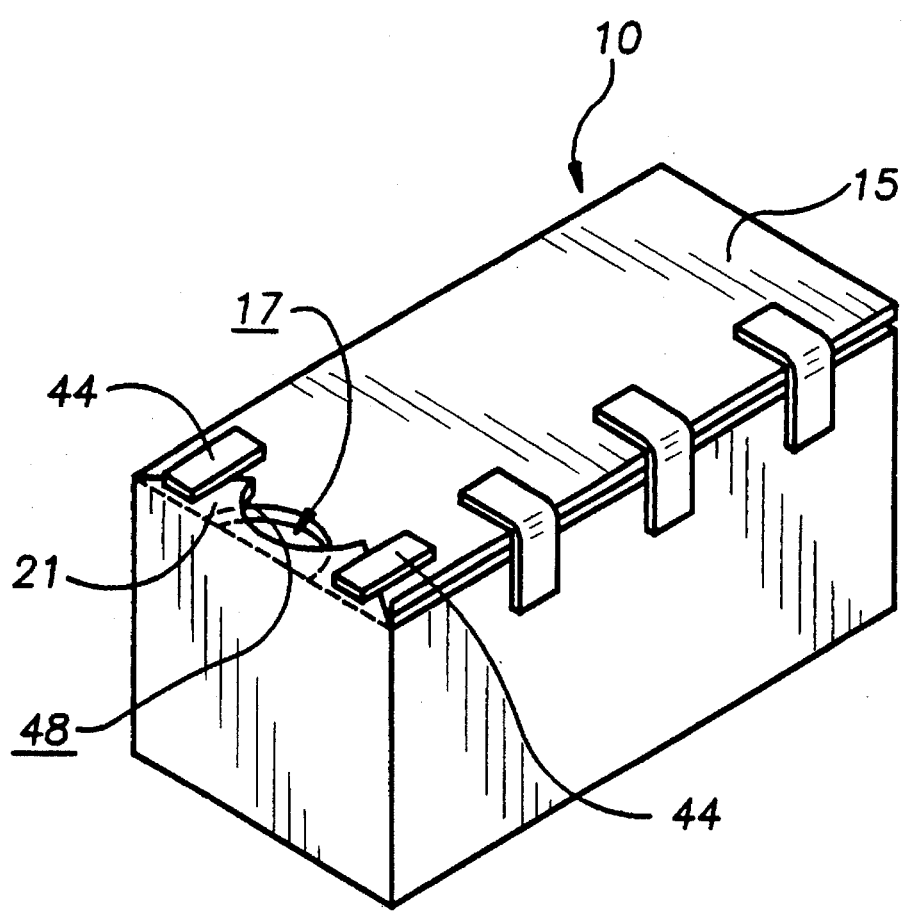
FIG. 3 is a perspective view of the restraint device of claim 1 with the closure member in the closed position and the pivoting member of the aperture adjustment mechanism in a position reducing the size of the closure aperture to its minimum size.

FIG. 3 shows restraint device 10 with closure member 15 in the closed position and pivoting member 21 folded over closure member 15 and secured with securing straps 44. Adjustment aperture 48 is positioned in relation to closure aperture 17 to produce a combined aperture through which the neck of the animal may be disposed but through which the head of the animal is to large to pass.

Figure 4:
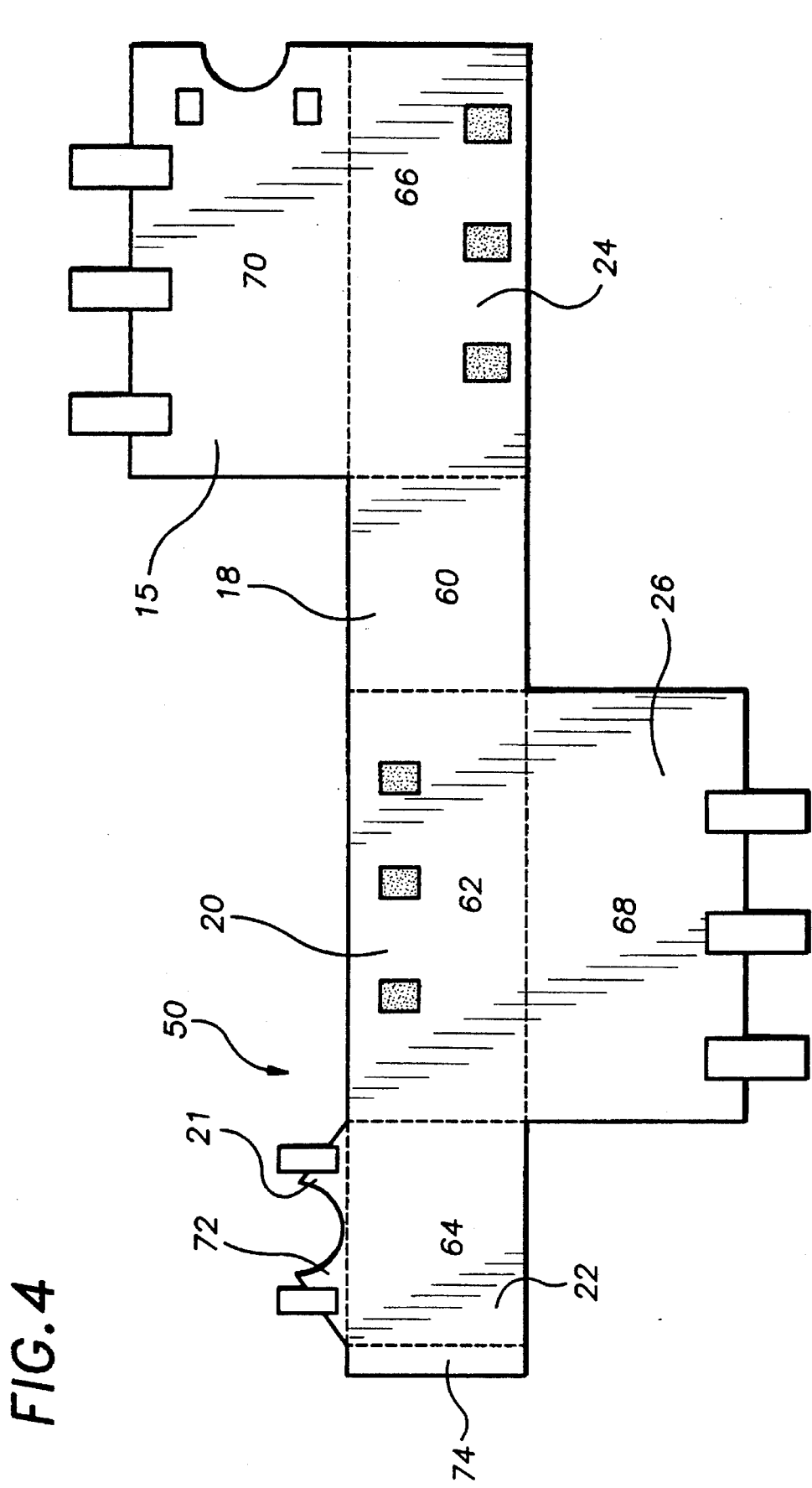
FIG. 4 is a schematic view of the restraint device of FIG. 1 prior to assembly.
Figure 5:
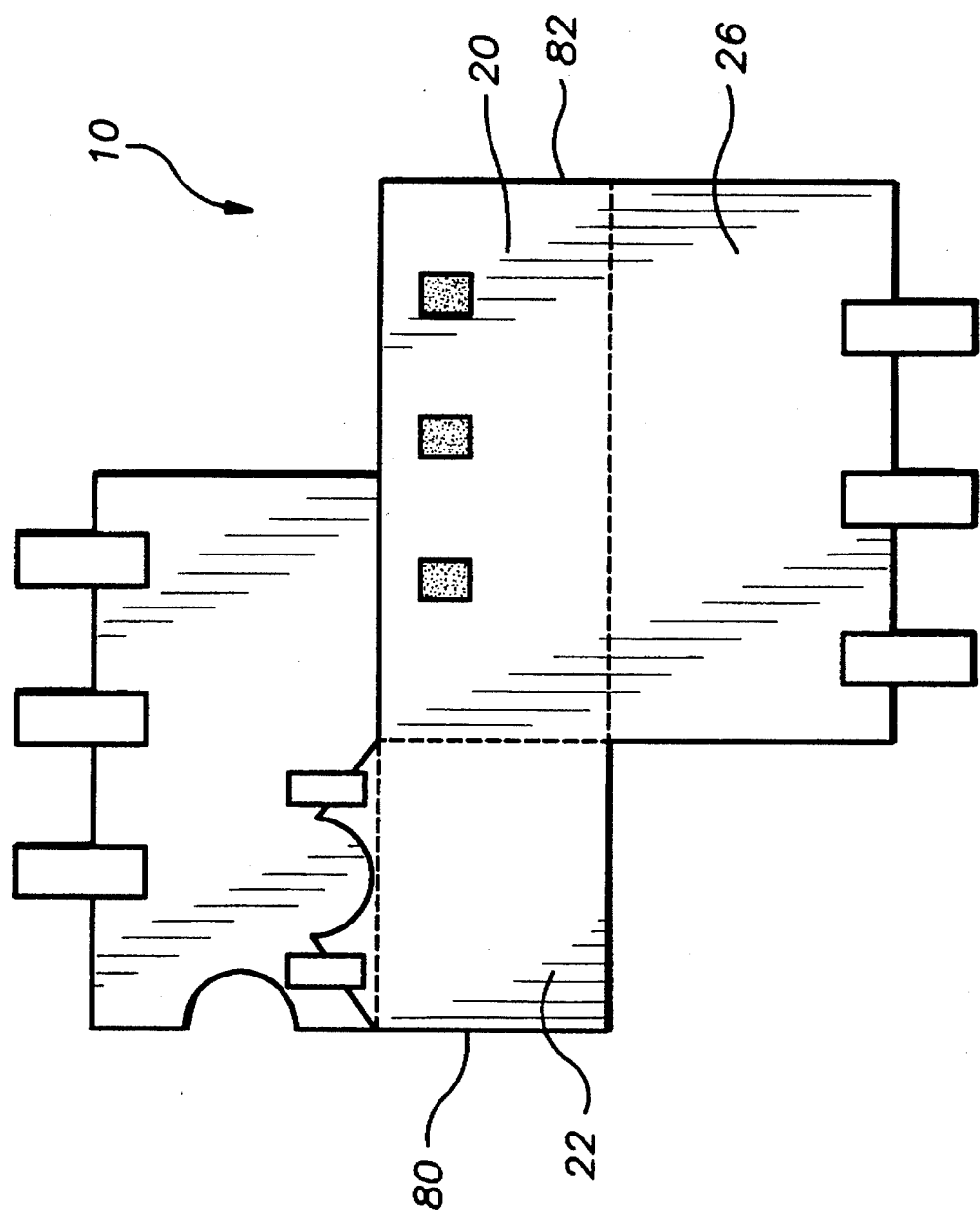
FIG. 5 is a schematic side view of one side of the restraint device of FIG. 1 in a collapsed configuration.

FIG. 4 is a top view of a cardboard cut-out, generally referred to by the numeral 50, that includes eight distinct regions 60,62,64,66,68,70,72,74 that are separated by creases designated in the figure by dashed lines. Regions 60,62,64,66,68,70, and 72 correspond, respectively, to side members 18,20,22,24, bottom member 26, closure member 15 and pivoting member 21. Region 74 is a substantially rectangular member used to adhesively secure side member 22 to side member 24 during construction of restraint device 20. FIG. 5 shows restraint device 10 collapsed for storage when not in use.

Use of restraint device 10 is now described with general reference to FIGS. 1–5. Restraint device 10 is generally retrieved from its storage location in the collapsed configuration shown in FIG. 5. A force is applied to edge 80 of side member 22 and edge 82 of side member 20 to form a substantially rectangular, four sided enclosure. Bottom member 26 is pivoted into a position blocking the bottom of the four sided enclosure and securement tabs 40 attached to pile sections 34. An animal, such as a cat or dog, is positioned within compartment 14, closure member 15 is then moved to the closed position and secured with fastening tabs 30. When the animal, attempting to escape from confinement, sticks its head and neck out through closure aperture 17, pivoting member 21 is pivoted into position and secured with securing straps 44. While pivoting member 21 is in position, the aperture through which the neck of the animal is disposed is reduced to a size too small for the animal to withdraw its head. With the animal thus restrained, the pet owner can administer the required medicine to the animal with reduced risk of injury to both the pet and the pet owner.

It can be seen from the preceding description that a device for restraining animals that is easy to use, easily stored when not needed, and inexpensive to manufacture has been provided.

It is noted that the embodiment of the animal restraint device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An animal restraint device comprising:

a housing having a compartment formed therein of a size sufficient to receive therein an animal; said housing having a first opening into said compartment and a closure member pivotally mounted adjacent said first opening in a manner to allow said closure member to be positioned over said first opening and partially block said animal from exiting said compartment through said first opening; said closure member having a closure perimeter having an aperture formed in connection therewith of a size sufficient to allow the head and neck of said animal to extend therethrough;

a first securing mechanism in connection with said closure member; said first securing mechanism being detachably securable to a portion of said housing when said closure member is positioned over said first opening; and an adjustment mechanism located adjacent said aperture having a pivotal portion that is pivotally positionable to adjust the size of said aperture while the neck of an animal is disposed therethrough in a manner such that the head of said animal is blocked from passing through said aperture.

2. The restraint device of claim 1, wherein:

said adjustment mechanism includes a pivoting member having a perimeter including a section thereof recessed in a manner to form an adjustment aperture; and a second securing mechanism in connection with said pivoting member in a manner such that said pivoting member may be secured in a plurality of positions.

3. The restraint device of claim 1, wherein:

said housing includes four substantially planar side members; each of said planar members being pivotally connected to two of said other planar members in a manner to form a collapsible four sided enclosure having an open top and bottom; and a substantially planar bottom member pivotally connected to one of said side members; said bottom member being pivotal into a position to block said open bottom of said four sided enclosure; and securing means for securing said bottom member in a position blocking said bottom of said four sided enclosure.

4. The restraint device of claim 3 wherein:

said four side members are integrally formed from a single planar member.

5. The restraint device of claim 4 wherein:

said four side members are constructed from cardboard.

6. The restraint device of claim 4 wherein:

said closure member is pivotally attached to one of said side members.

7. The restraint device of claim 4 wherein:

said bottom member is pivotally attached to one of said side members.

8. The restraint device of claim 4, wherein:

said adjustment mechanism includes a pivoting member, pivotally attached to one of said side members, having a perimeter including a section thereof recessed in a manner to form an adjustment aperture; and said restraint device further includes:

a second securing mechanism in connection with said pivoting member in a manner such that said pivoting member may be secured in a plurality of positions.

9. The restraint device of claim 4 wherein:

said closure member is pivotally attached to one of said side members; and said bottom member is pivotally attached to one of said side members.

10. The restraint device of claim 9, wherein:

said adjustment mechanism includes a pivoting member, pivotally attached to one of said side members, having a perimeter including a section thereof recessed in a manner to form an adjustment aperture; and said restraint device further includes:

a second securing mechanism in connection with said pivoting member in a manner such that said pivoting member may be secured in a plurality of positions.

11. The restraint device of claim 4, wherein:

said adjustment mechanism includes a pivoting member, pivotally attached to one of said side members, having a perimeter including a section thereof recessed in a manner to form an adjustment aperture; and said closure member is pivotally attached to one of said side members adjacent said side member to which said pivoting member is attached.

12. The restraint device of claim 4 wherein:

said closure member is integrally formed with one of said side members.

13. The restraint device of claim 4 wherein:

said bottom member is integrally formed with one of said side members.

14. The restraint device of claim 4, wherein:

said adjustment mechanism includes a pivoting member, integrally formed with one of said side members, having a perimeter including a section thereof recessed in a manner to form an adjustment aperture; and said restraint device further includes:

a second securing mechanism in connection with said pivoting member in a manner such that said pivoting member may be secured in a plurality of positions.

15. The restraint device of claim 4 wherein:

said closure member is integrally formed with one of said side members; and said bottom member is integrally formed with one of said side members.

16. The restraint device of claim 15, wherein:

said adjustment mechanism includes a pivoting member, integrally formed with one of said aide members, having a perimeter including a section thereof recessed in a manner to form an adjustment aperture; and said restraint device further includes:

a second securing mechanism in connection with said pivoting member in a manner such that said pivoting member may be secured in a plurality of positions.

17. The restraint device of claim 4, wherein:

said adjustment mechanism includes a pivoting member, integrally formed with one of said side members, having a perimeter including a section thereof recessed in a manner to form an adjustment aperture; and said closure member is integrally formed with one of said side members adjacent said side member to which said pivoting member is attached.

18. An animal restraint device comprising:

a housing having a compartment formed therein of a size sufficient to receive therein an animal; said housing having a first opening into said compartment and a closure member pivotally mounted adjacent said first opening in a manner to allow said closure member to be positioned over said first opening and partially block said animal from exiting said compartment through said first opening; said closure member having a closure perimeter having an aperture formed in connection therewith of a size sufficient to allow the head and neck of said animal to extend therethrough, said housing including four substantially planar side members; each of said planar side members being pivotally connected to two of said other planar members in a manner to form a collapsible four sided enclosure having an open top and bottom; a substantially planar bottom member pivotally connected to one of said side members; said bottom member being pivotal into a position to block said open bottom of said four sided enclosure, and securing means for securing said bottom member in a position blocking said bottom of said four sided enclosure;

a first securing mechanism in connection with said closure member; said first securing mechanism being detachably securable to a portion of said housing when said closure member is positioned over said first opening;

an adjustment mechanism located adjacent said aperture having a pivotal portion that is pivotally positionable to adjust the size of said aperture while the neck of an animal is disposed therethrough in a manner such that the head of said animal is blocked from passing through said aperture, said adjustment mechanism including a pivoting member having a perimeter including a section thereof recessed in a manner to form an adjustment aperture; and a second securing mechanism in connection with said pivoting member in a manner such that said pivoting member may be secured in a plurality of positions.

19. The restraint device of claim 18 wherein:

said four side members are integrally formed from a single planar member.

20. The restraint device of claim 19, wherein:

said first and second securing mechanisms each include section of hook and pile type closures.

* * * * *